(12) United States Patent
Hopson

(10) Patent No.: US 10,714,068 B2
(45) Date of Patent: Jul. 14, 2020

(54) MOUTHPIECE WITH WHISTLING MECHANISM

(71) Applicant: David Hopson, Cypress, TX (US)

(72) Inventor: David Hopson, Cypress, TX (US)

(73) Assignee: David Hopson, Cypress, TX (US)

( * ) Notice: Subject to any disclaimer, the term of this patent is extended or adjusted under 35 U.S.C. 154(b) by 0 days.

(21) Appl. No.: 15/226,764

(22) Filed: Aug. 2, 2016

(65) Prior Publication Data
US 2017/0040011 A1 Feb. 9, 2017

Related U.S. Application Data

(60) Provisional application No. 62/200,298, filed on Aug. 3, 2015.

(51) Int. Cl.
*A63H 5/00* (2006.01)
*G10K 5/00* (2006.01)
*A01M 31/00* (2006.01)

(52) U.S. Cl.
CPC ............. *G10K 5/00* (2013.01); *A01M 31/004* (2013.01)

(58) Field of Classification Search
CPC ................................ G10K 5/00; A01M 31/004
USPC ..................... 446/202, 203, 204, 206, 207
See application file for complete search history.

(56) References Cited

U.S. PATENT DOCUMENTS

| | | | | |
|---|---|---|---|---|
| 733,122 A * | 7/1903 | Bartholomew | ........... | G10K 5/00 446/204 |
| 1,367,176 A * | 2/1921 | Bridges | ..................... | A63H 5/00 446/202 |
| 2,052,926 A * | 9/1936 | Frisk | ......................... | G10K 5/00 84/330 |
| 2,083,669 A * | 6/1937 | Ruhlmann | ................ | G10D 7/02 84/330 |
| 2,388,495 A * | 11/1945 | Osterholt | .................. | G10K 5/00 446/204 |
| 2,463,630 A * | 3/1949 | Kimple | ..................... | G10D 7/02 446/204 |
| 2,877,598 A * | 3/1959 | Seron | ......................... | G10K 5/00 124/62 |
| 4,218,845 A * | 8/1980 | Evans | ....................... | G10D 7/12 446/202 |
| 4,246,824 A * | 1/1981 | Hanson | .................... | A63H 5/00 446/204 |
| 4,614,503 A * | 9/1986 | Skoda | ....................... | A63H 5/00 446/176 |
| 4,709,651 A * | 12/1987 | Lance | ...................... | G10K 5/00 116/137 R |
| 4,821,670 A | 4/1989 | Foxcroft et al. | | |
| 5,113,784 A * | 5/1992 | Forselius | .................. | G10K 5/00 116/137 R |
| 5,165,423 A * | 11/1992 | Fowler | .................. | A63B 71/085 128/861 |

(Continued)

*Primary Examiner* — Joseph B Baldori
(74) *Attorney, Agent, or Firm* — Williams Morgan, P.C.

(57) ABSTRACT

A whistle mouthpiece is provided that has a whistle mechanism that comprises one or more openings that may contain one or more reeds or other frequency producing mechanisms that produce the same or different resonant frequencies. The one or more openings may transversely cross the whistle mouthpiece in a parallel manner, or may alternatively exit the whistle mouthpiece at the front portion at a non-parallel location or at another location along the bottom or top of the mouthpiece.

20 Claims, 12 Drawing Sheets

(56) References Cited

U.S. PATENT DOCUMENTS

| | | | | |
|---|---|---|---|---|
| 5,546,887 A | * | 8/1996 | Cameron | G10K 5/00 |
| | | | | 116/137 R |
| 5,816,186 A | | 10/1998 | Sheperd | |
| 6,109,202 A | * | 8/2000 | Topman | G10K 5/00 |
| | | | | 116/137 R |
| 7,145,067 B2 | * | 12/2006 | Pfortmiller | A01M 31/004 |
| | | | | 446/204 |
| 7,191,779 B2 | * | 3/2007 | Shiue | B63C 11/26 |
| | | | | 128/201.11 |
| 8,382,549 B2 | * | 2/2013 | Shishido | G10K 5/00 |
| | | | | 446/202 |
| 8,776,713 B2 | * | 7/2014 | Shishido | G10K 5/00 |
| | | | | 116/137 R |
| 8,800,184 B1 | * | 8/2014 | Lerman | G09F 23/00 |
| | | | | 128/861 |
| 2003/0033970 A1 | * | 2/2003 | Hills | G10K 5/00 |
| | | | | 116/137 R |
| 2007/0026760 A1 | * | 2/2007 | Stong, II | A01M 31/004 |
| | | | | 446/204 |
| 2008/0003541 A1 | * | 1/2008 | Leslie-Martin | A61C 5/00 |
| | | | | 433/215 |
| 2009/0068921 A1 | * | 3/2009 | Nagy | G10K 5/00 |
| | | | | 446/204 |

* cited by examiner

MOUTHPIECE WITH WHISTLING MECHANISM

This application claims priority to Provisional Application Ser. No. 62/200,298 filed Aug. 3, 2015.

BACKGROUND OF THE INVENTION

Field of the Invention

This disclosure relates to a whistle mouthpiece, such as a grill mouthpiece having a whistle mechanism.

BACKGROUND OF THE INVENTION

Whistles are known in the art and are used for a variety of purposes. For example, whistles have been used in sporting events for years. Other types of whistles have also been used, for example to train animals. Examples of various whistles include those disclosed in U.S. Pat. Nos. 5,816,186 and 4,821,670.

Mouthpieces are also well known in the art. For example, certain mouthpieces have been worn by athletes to protect against injury. Other mouthpieces are worn by people in a more casual manner. Still others wear mouthpieces that are referred to as grills.

The present disclosure relates to a mouthpiece or grill that is also capable of producing a whistling sound. Such a whistle mouthpiece is simple to manufacture and assemble and is preferably made of a suitable material for insertion into a mouth of someone or something.

SUMMARY OF THE DISCLOSURE

In some embodiments, the present disclosure relates to a grill mouthpiece having a whistle mechanism that comprises one or more openings that may contain one or more reeds or other frequency producing mechanism that produce the same or different resonant frequencies. The whistle mechanism has one or more inlet openings extending transversely through the top or bottom portion of the grill mouthpiece. The inlet openings may also extend through the mouthpiece and exit the mouthpiece at a non-transverse location.

In some embodiments, the present disclosure relates to an apparatus for producing a whistling sound comprising a mouthpiece having a curved shape, at least one opening in said mouthpiece at a lower portion of said mouthpiece and wherein the at least one opening is capable of producing a whistling sound when air passes through said opening.

In some embodiments, the present disclosure relates to a whistle mouthpiece comprising a mouthpiece, at least one opening in said mouthpiece at an upper portion of said mouthpiece and wherein the at least one opening is capable of producing a whistling sound when air passes through said opening.

In some embodiments, the present disclosure relates to a whistle mouthpiece comprising a mouthpiece capable of covering the teeth of an upper and lower jaw, at least one opening in said mouthpiece near a middle portion of said mouthpiece and wherein the at least one opening is capable of producing a whistling sound when air passes through said opening.

In some embodiments, the present disclosure relates to A whistle mouthpiece comprising a mouthpiece, at least one opening in said mouthpiece near a lower portion of said mouthpiece and a reed located in said at least one opening.

DESCRIPTION OF THE DRAWINGS

The disclosure may be understood by reference to the following description taken in conjunction with the accompanying drawings, in which like reference numerals identify like elements, and in which.

Figure 1:
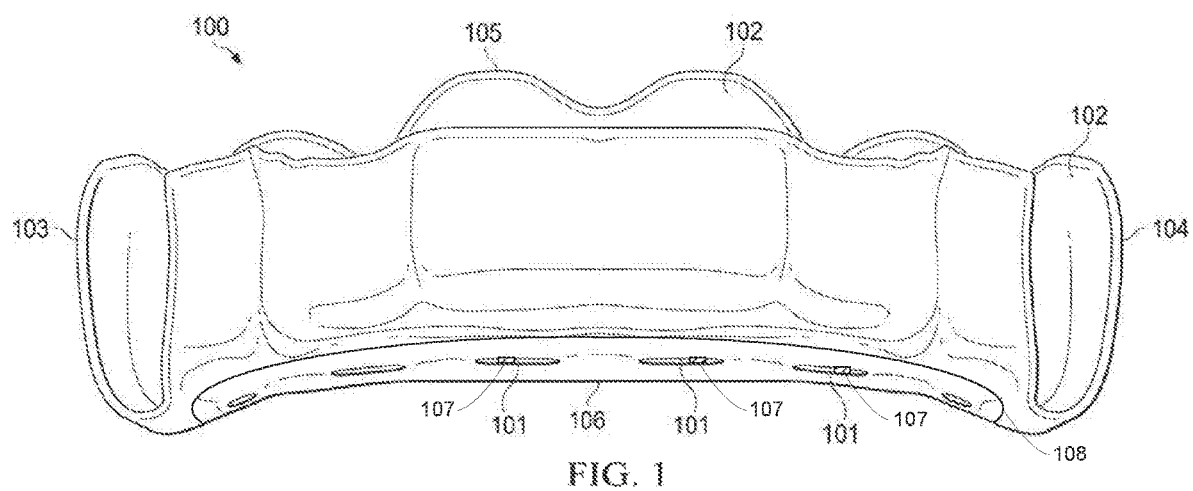
FIG. 1 is a perspective view of the whistle mouthpiece taken from the rear.

While the disclosure is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION OF SPECIFIC EMBODIMENTS

Illustrative embodiments of the disclosure are described herein. For clarity, not all features of an actual implementation are described. In the development of any actual embodiment, numerous implementation-specific decisions must be made to achieve design-specific goals, which will vary from one implementation to another. Such a development effort, while possibly complex and time-consuming, would nevertheless be a routine undertaking for persons of ordinary skill in the art having the benefit of this disclosure.

Reference is made to FIG. 1, which show whistle mouthpiece 100 and including slots 101 at the whistle mouthpiece lower portion. Slots 101 may be of any size or shape (e.g., round, square, oblong, etc.) and may or may not have reeds 107 or other mechanisms for creating different frequencies and/or whistle tones when subject to airflow that is forced through slots 101. As shown, whistle mouthpiece has 6 slots. Whistle mouthpiece 100 has a curved shape such that it is capable of fitting into a mouth of someone or something. Whistle mouthpiece 100 may be designed to fit over the upper teeth, the lower teeth, or both. Whistle mouthpiece 100 has at least one cavity 102 that allows whistle mouthpiece to fit over a set of teeth. Cavities 102 may contain a thin portion of plastic, padding, flexible material or other material so as to make whistle mouthpiece comfortable to wear. Whistle mouthpiece has a left side 103, a right side 104, a top portion 105, a bottom portion 106 and a front portion (not shown). The inner portions of left side 103, a right side 104, a top portion 105, and bottom portion 106 may also contain a thin portion of plastic, padding, flexible material or other material so as to make it comfortable to wear.

Figure 2:
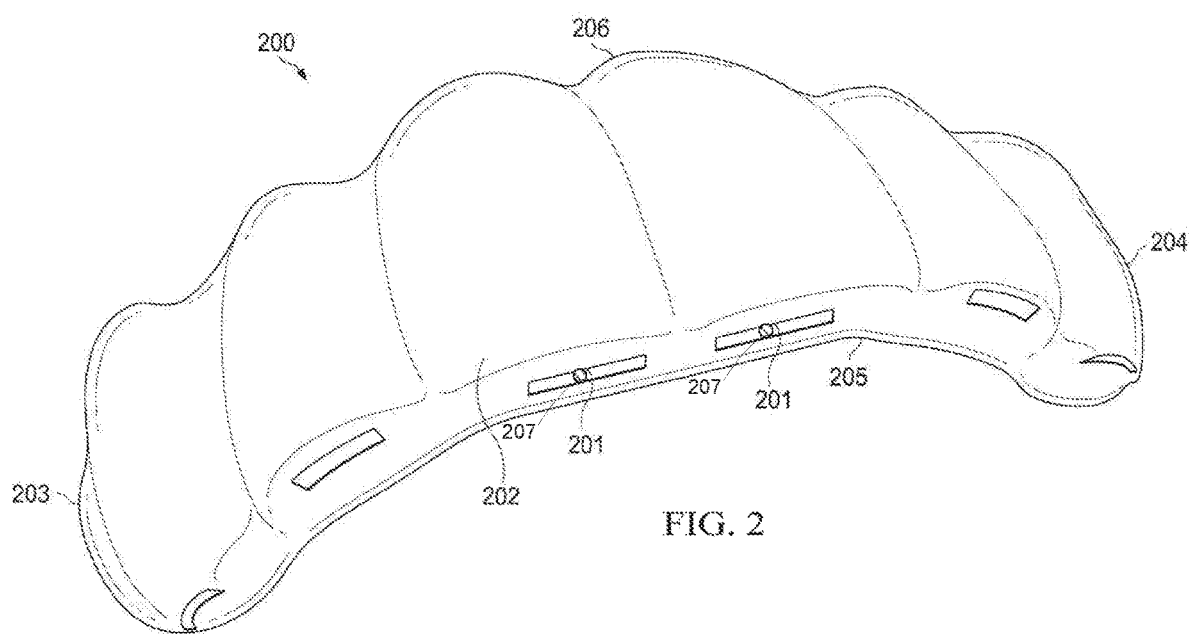
FIG. 2 is a perspective view of another whistle mouthpiece taken from a different angle.

FIG. 2 shows an alternative view of the whistle mouthpiece of FIG. 1. In this embodiment, whistle mouthpiece 200 has two slots 201 located in lower portion 205 of whistle mouthpiece. Each slot 201 may contain a ball 207 or other mechanisms for creating different frequencies or whistle sounds.

Figure 3:
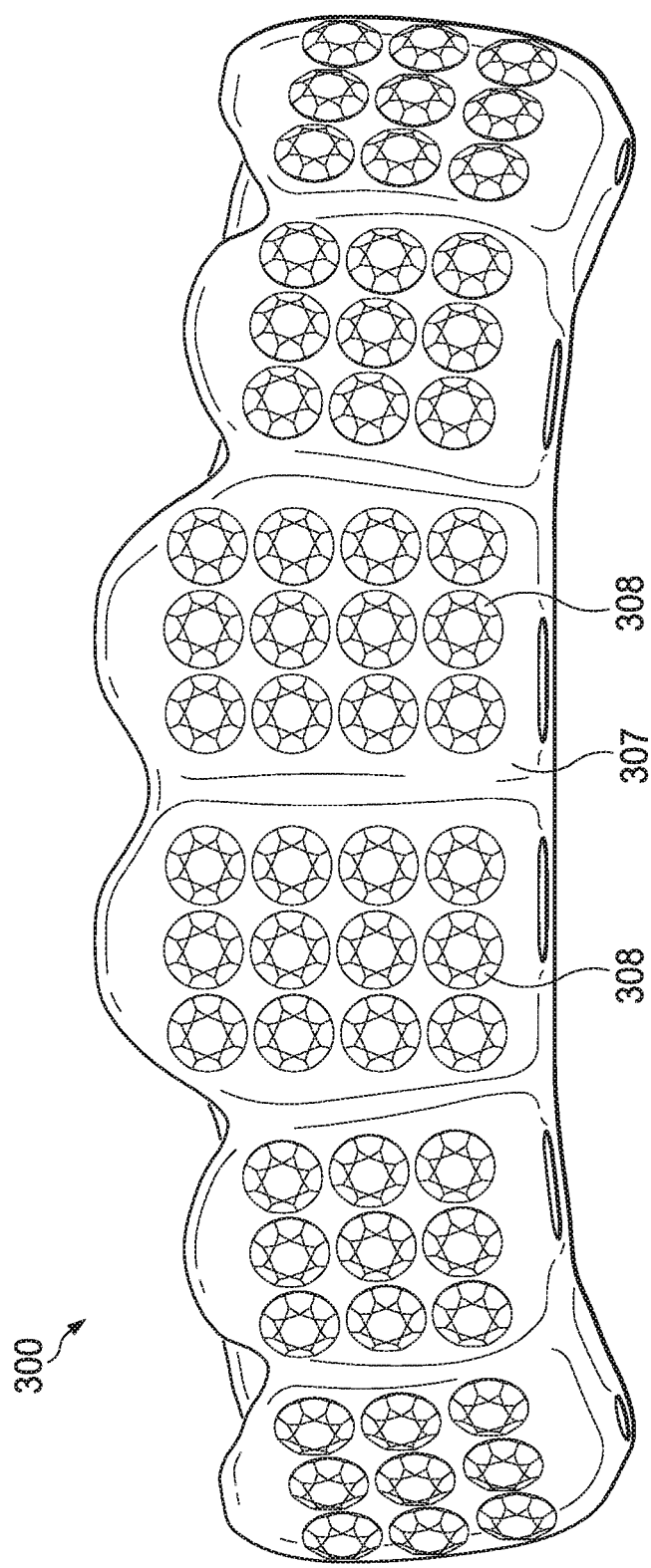
FIG. 3 is a perspective view of a whistle mouthpiece from the front.

FIG. 3 shows the front portion 307 of a whistle mouthpiece of an embodiment of the invention. In this embodiment, front portion has jewels 308 affixed or formed into whistle mouthpiece. As one of skill in the art can appreciate, other types of jewels or decorative material may also be affixed or formed into whistle mouthpiece.

Figure 4:
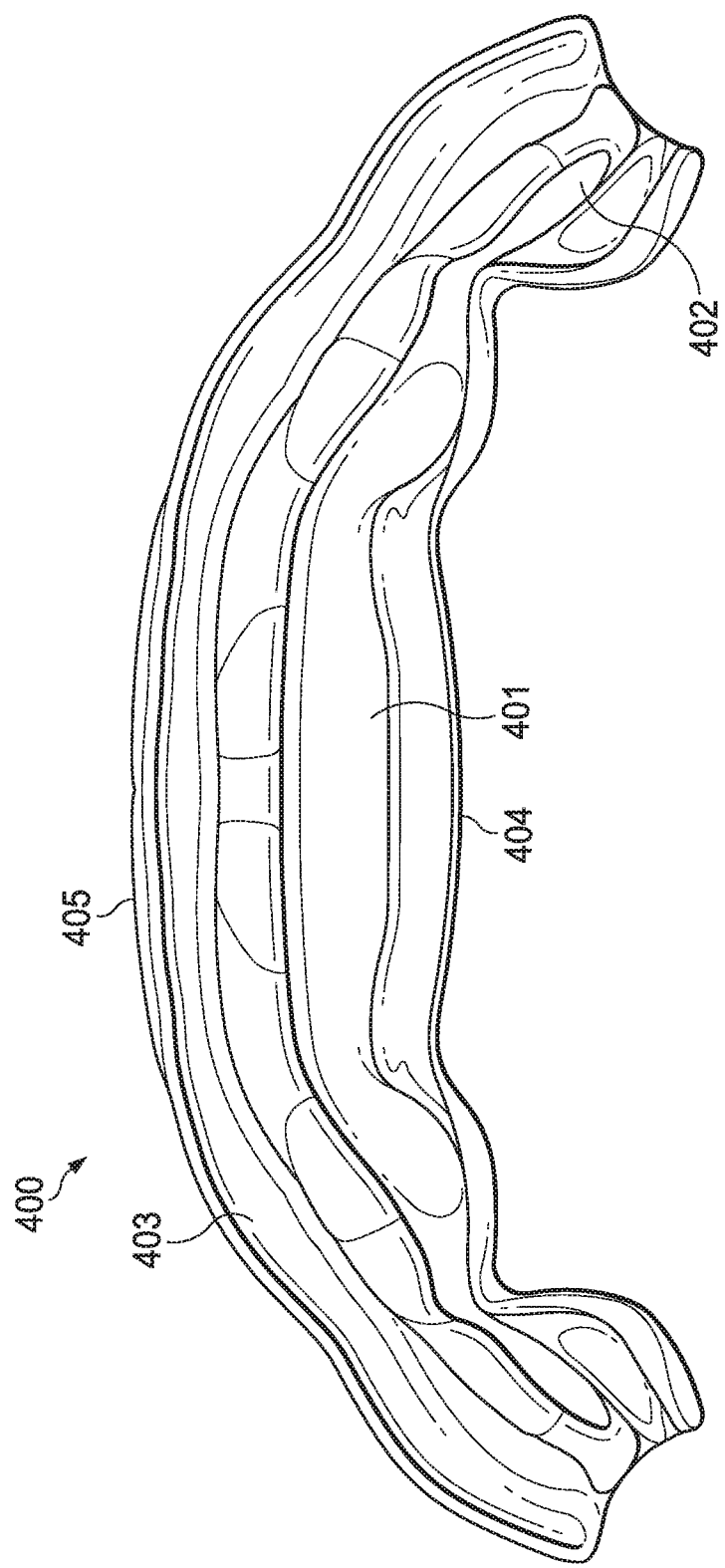
FIG. 4 is a perspective view of a whistle mouthpiece from the top.

FIG. 4 shows a top view of whistle mouthpiece 400. As can be seen, whistle mouthpiece has several cavities 401-403 of various sizes and shapes that are capable of conforming to various types and sizes of teeth. Sidewalls 404 and 405 of whistle mouthpiece 400 may also contain a thin portion of plastic, padding, flexible material or other material so as to make it comfortable once it slides over teeth up to the gum line.

Figure 5:
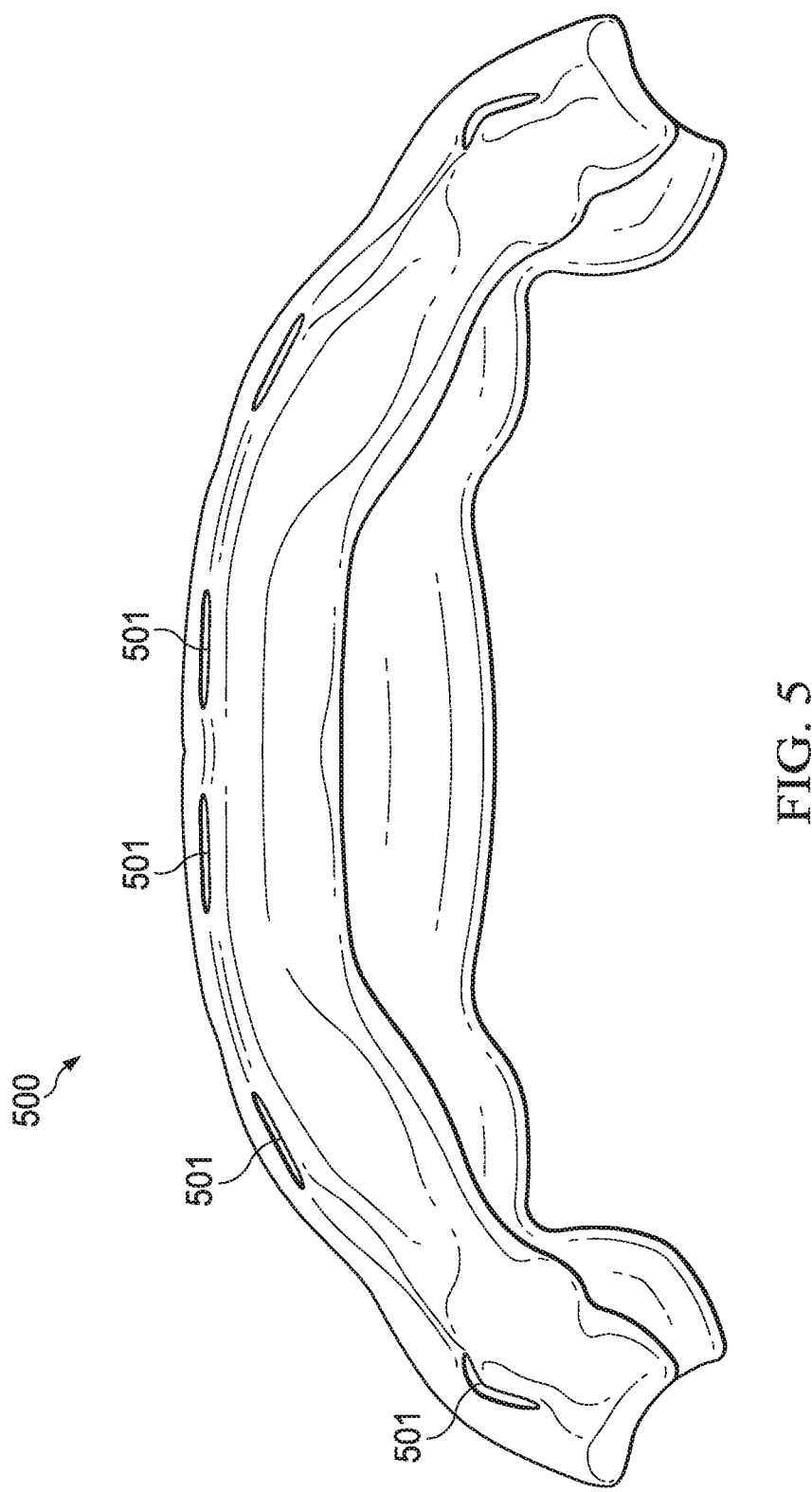
FIG. 5 is a perspective view of a whistle mouthpiece from the bottom.
Figure 6:
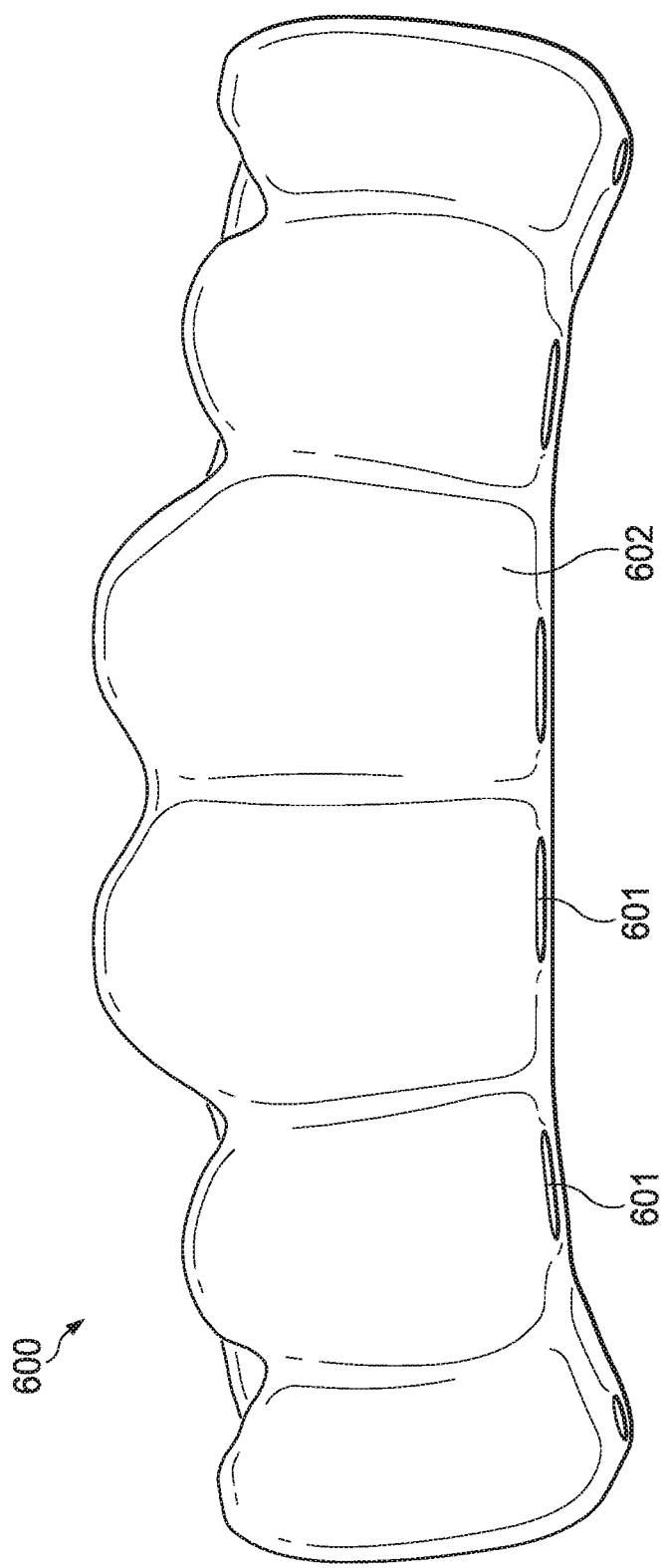
FIG. 6 is a perspective view of a whistle mouthpiece from the front.

FIG. 5 shows a bottom view of whistle mouthpiece 500. As can be seen, slots 501 may open to the bottom portion of the whistle mouthpiece. Alternatively, as shown in FIG. 6, slots 601 may transverse the bottom portion of whistle mouthpiece 600 and open to the front portion of whistle mouthpiece 602. Whistle mouthpiece 600 may also be formed so as to resemble the appearance of teeth.

Figure 7:
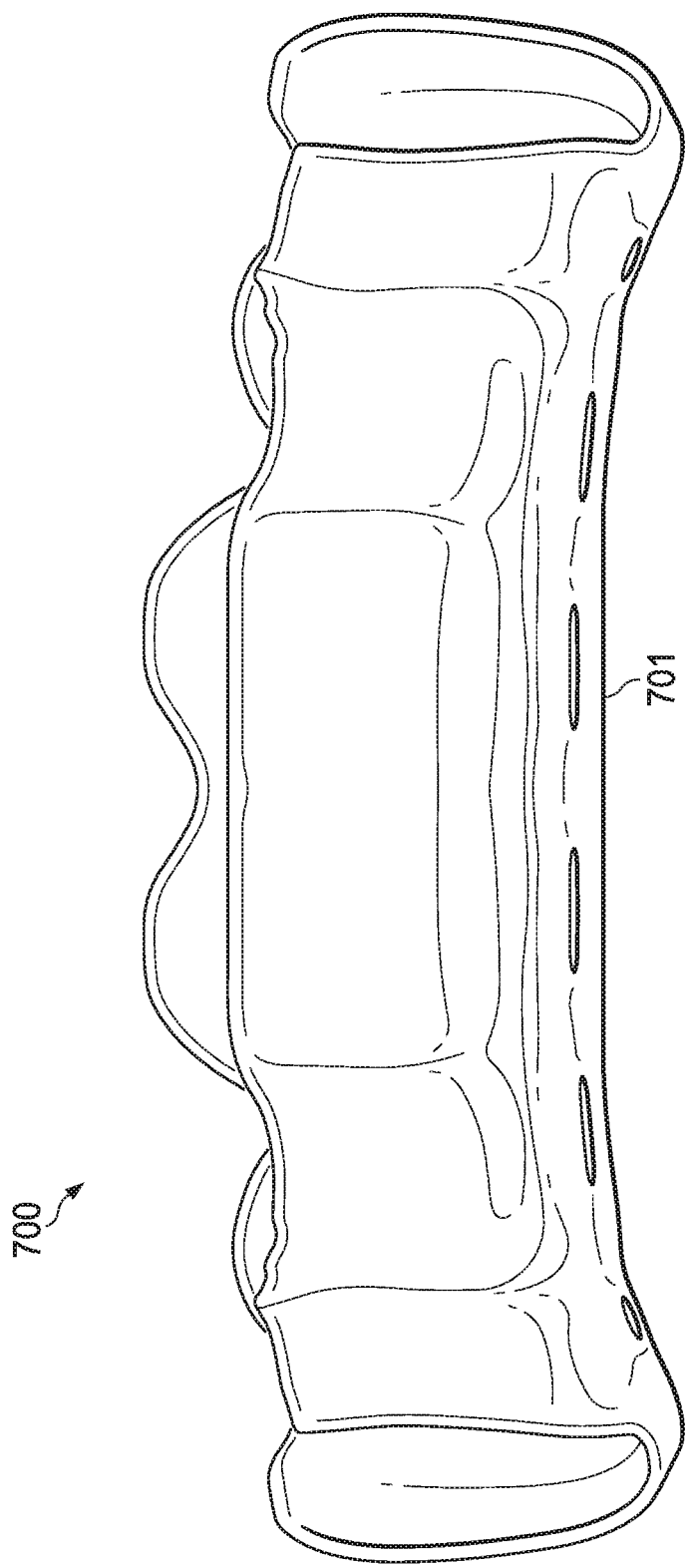
FIG. 7 is a perspective view of a whistle mouthpiece showing dimensions.

FIG. 7 shows an exemplary embodiment that has dimensions. As shown, whistle mouthpiece, 700, is approximately 1 cm in height, 5.5 cm across, and has a 1.4 cm bottom plate 701 that extends from the front to the rear of whistle mouthpiece. The foregoing are exemplary dimensions and one of skill in the art can appreciate that whistle mouthpiece can be made of any dimension desired to fit any size or shape of mouth and/or teeth.

Whistle mouthpiece may be made of any suitable material including, for example, silver, gold or any other metal, any type of plastic, or rubber material, any type of composite material, or any combination of the foregoing.

Whistle mouthpiece may be formed in a single piece or may be composed of multiple pieces. For example, the lower portion containing slots that provide for the ability of the device to produce whistle sounds may be formed of a separate piece such that it allows for interchangeability of other types of whistling mechanisms. For example, as depicted in FIG. 1, the bottom portion 106 of the whistle mouthpiece may be removable, e.g., the whistle mouthpiece 100 may comprise a first portion comprising the bottom portion 106 and a second portion comprising the top portion 105, wherein the first portion and the second portion may be attached and detached at junction 108. The separate portions may contain fasteners that enable them to attach together, for example, snap in fasteners, slide in fasteners, tongue and groove (slot) fasteners or any other fasteners that would be known by one of skill in the art.

Whistle mouthpiece may be suitably formed such that it will fit over the top of teeth on the upper jaw or the lower jaw, or both. The descriptions herein should be understood to encompass all such configurations. By way of example, when the whistle mouthpiece is described as having slots at its bottom portion, it should be understood that this refers to the bottom portion of a whistle mouthpiece that fits over the teeth of an upper jaw. It should be readily understood also, that one could produce a whistle mouthpiece that has slits at its upper portion and that fits over the teeth of a lower jaw.

Whistle mouthpiece may also contain jewels or other decorative items, either as part of, or affixed to the whistle mouthpiece. Whistle mouthpiece contains one or more cavities sufficient to enable whistle mouthpiece to fit in a mouth of someone or something. Further, whistle mouthpiece may fit snugly or loosely over the teeth of someone or something.

The slots of the whistle mouthpiece may or may not contain elements that produce whistle sounds when air is forced through them. Slots themselves may also be formed such that a whistle sound is produced when air is forced through them. Examples of elements that may be contained within slot that produce different frequencies or whistle sounds include reeds, balls, etc. The whistle producing elements may be made of any suitable material including metal, wood, plastic, rubber, composites, etc.

The slots of the whistle mouthpiece may horizontally traverse the lower portion of the whistle mouthpiece. Alternatively, the slots may be formed in such a manner that they are open at the back portion of the whistle mouthpiece and are also open at the bottom side of the whistle mouthpiece. Slots may also be formed in such a manner that they are open at the back portion of the whistle mouthpiece and are also open at some angle above horizontal at the front portion of the whistle mouthpiece.

The slots of the whistle mouthpiece may produce differing frequencies or whistle tones, or may all produce the same frequency or whistle tone. The slots may also be made such that they are adjustable or easily swapped out for another such that they are interchangeable. One of skill in the art will appreciate many ways to make the slots interchangeable. For example, slots may be contained in a square or rectangular piece that slides into a hole in the bottom portion of mouthpiece of suitable size for accepting said piece containing said slots.

Figure 8:
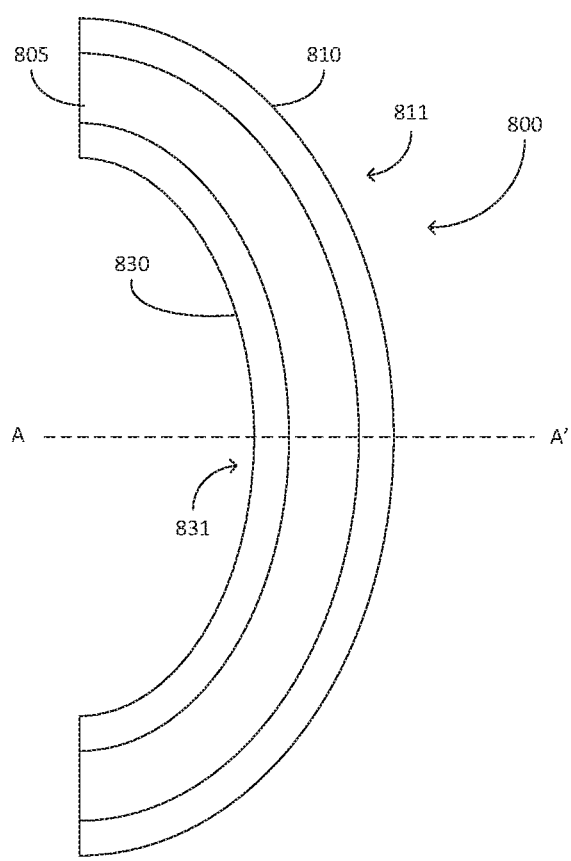
FIG. 8 is a schematic top view of a whistle mouthpiece, in accordance with one more embodiments of the disclosure.

FIG. 8 shows a whistle mouthpiece 800 in schematic top or plan view according to one or more embodiments. The whistle mouthpiece 800 is curved in top view. The curve in top view defines an outer curve 811 and an inner curve 831.

The curve in top view generally corresponds to the typical curve of upper teeth of a human being.

The whistle mouthpiece 800 comprises a first side portion 810 and a second side portion 830. The first side portion 810 is on the outer curve 811 of the whistle mouthpiece 800 and the second side portion 830 is on the inner curved 831 of the whistle mouthpiece 800. Visible in top plan view between the first side portion 810 and the second side portion 830 is a surface 805.

Figure 9A:
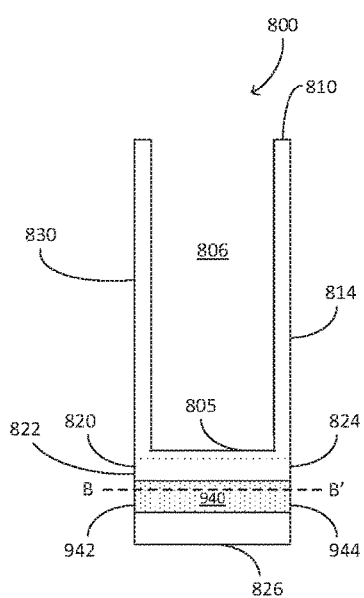
FIG. 9A is a schematic side cross-section view of a whistle mouthpiece taken along line A-A' in FIG. 8, in accordance with one or more embodiments of the disclosure.

FIG. 9A shows a schematic side cross-section view of the whistle mouthpiece 800 taken along line A-A' in FIG. 8, in accordance with one or more embodiments of the disclosure. As can be seen, the whistle mouthpiece 800 has a U-shape in side cross-section, defined by the first side portion 810, the second side portion 830, and the surface 805. Also labeled in FIG. 9A is outer face 814 of the first side portion 810. The outer face 814 is the face disposed along the outer curve 811 of the whistle mouthpiece 800. The first side portion 810, the second side portion 830, and the surface 805 define a cavity 806 configured to allow the whistle mouthpiece 800 to fit over upper teeth.

FIG. 9A also shows a bottom portion 820 of the whistle mouthpiece 800. A dotted line extending horizontally across the whistle mouthpiece 800 shows a boundary between the region with the first side portion 810, second side portion 830, and surface 805, on the one hand, and the bottom portion 820 on the other. The dotted line is included solely to aid the reader and is not a physical substructure of the whistle mouthpiece 800.

The bottom portion 820 has a back 822 and a front 824. The front 824 is on the same side of the whistle mouthpiece as the outer face 814 of the first side portion 810. The bottom portion 820 also comprises a bottom side 826.

As can be seen, the outer face 814 is substantially vertical in side cross-section. Also, the outer face 814 is substantially perpendicular to the bottom side 826 in side cross-section.

The bottom portion 820 comprises at least one slot 940 that is capable of producing a whistling sound when air passes through the slot 940. As shown in FIG. 9A, the slot 940 has an inlet opening 942 at the back 822 of the bottom portion 820. The slot 940 also has an outlet opening 944 at a front 824 of the bottom portion 820. In other words, the slot 940 of FIG. 9A horizontally traverses the bottom portion 820 (alternatively referred to herein as the lower portion) of the whistle mouthpiece 800.

Figure 9B:
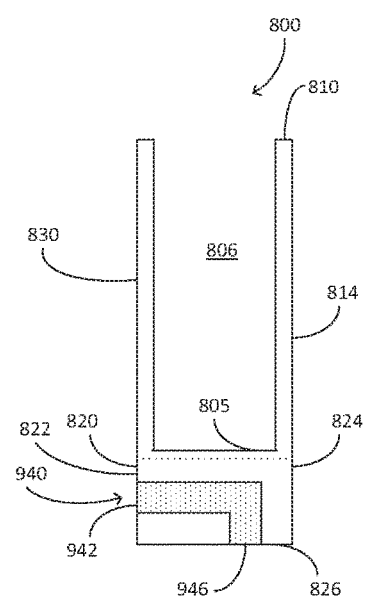
FIG. 9B is a schematic side cross-section view of a whistle mouthpiece taken along line A-A' in FIG. 8, in accordance with one or more other embodiments of the disclosure.
Figure 9C:
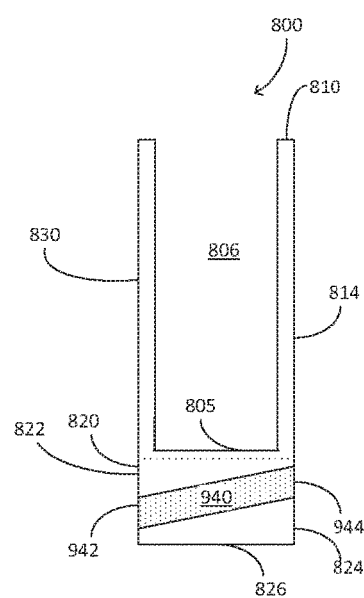
FIG. 9C is a schematic side cross-section view of a whistle mouthpiece taken along line A-A' in FIG. 8, in accordance with one or more further other embodiments of the disclosure.

Turning to FIG. 9B and FIG. 9C, alternative embodiments of the whistle mouthpiece 800 are shown. These embodiments differ from that shown in FIG. 9A regarding the location of the outlet opening 944 or 946 of the slot 940. In FIG. 9B, the slot 940 has an outlet opening 946 on the bottom side 826 of the bottom portion 820. In FIG. 9C, the outlet opening 944 is on the front 824 of the bottom portion 820, but higher than the inlet opening 942. In other words, instead of the slot 940 of FIG. 9C horizontally traversing, the slot 940 of FIG. 9C traverses the bottom portion 820 at an angle above horizontal.

Figure 10A:
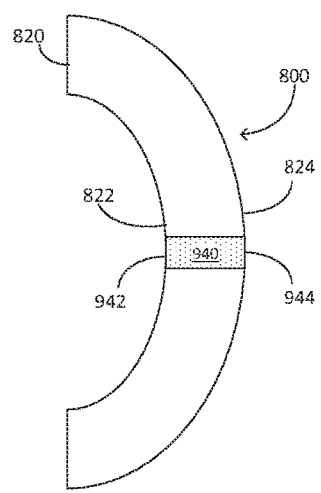
FIG. 10A is a schematic top cross-section view of a whistle mouthpiece taken along line B-B' in FIG. 9A, in accordance with one or more embodiments of the disclosure.
Figure 10B:
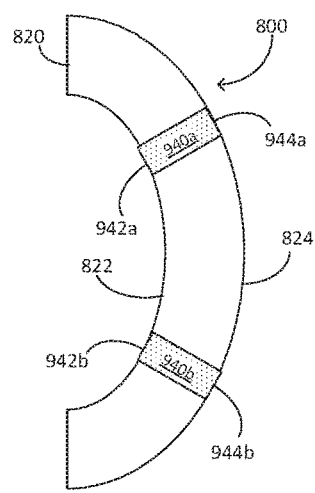
FIG. 10B is a schematic top cross-section view of a whistle mouthpiece, in accordance with one or more other embodiments of the disclosure.
Figure 10C:
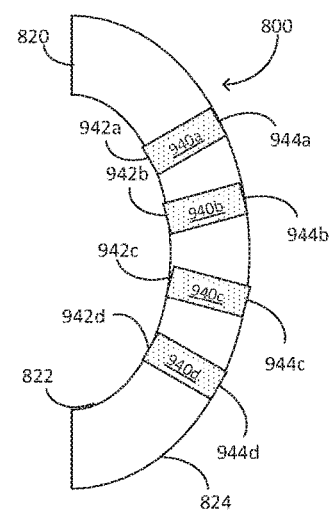
FIG. 10C is a schematic top cross-section view of a whistle mouthpiece, in accordance with one or more further other embodiments of the disclosure.

FIG. 10A is a schematic top cross-section view of a whistle mouthpiece 800 taken along line B-B' in FIG. 9A, in accordance with one or more embodiments of the disclosure. The slot 940 traverses the bottom portion 830 from the inlet opening 942 at the back 822 to the outlet opening 944 at the front 824. FIG. 10B and FIG. 10C show top cross-section views of other embodiments of whistle mouthpiece 800, in which the bottom portion 820 comprises two slots 940a and 940b (as shown in FIG. 10B) or four slots 940a-940d (as shown in FIG. 10C). Other numbers of slots, e.g. six slots, may be used in other embodiments (not shown).

Figure 11:
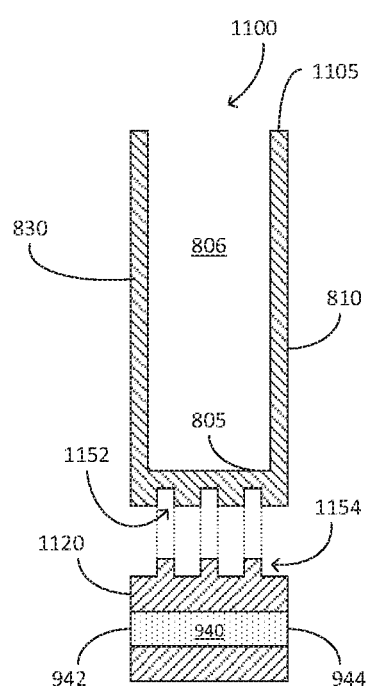
FIG. 11 is a schematic side cross-section view of a whistle mouthpiece taken along line A-A' in FIG. 8, in accordance with one or more further other embodiments of the disclosure.

FIG. 11 is a schematic side cross-section view of a whistle mouthpiece 1100 taken along line A-A' in FIG. 8, in accordance with one or more further other embodiments of the disclosure. In this embodiment, the whistle mouthpiece 1100 comprises multiple pieces or separate portions, namely, a first piece 1105 and a second piece 1120. The first piece 1105 comprises the first side portion 810 and the second side portion 830, as well as the surface 805. Accordingly, in this embodiment, the cavity 806 is fully contained within the first piece 1105. The second piece 1120 contains (a) slot(s) 940 therethrough.

The first and second pieces 1105 and 1120 are capable of being attached and detached to each other. For example, as shown in FIG. 11, the first piece 1105 may contain one or more (e.g., as depicted, three) receptacles 1152 into each of which a corresponding fastening element 1154 may be reversibly placed.

Figure 12:
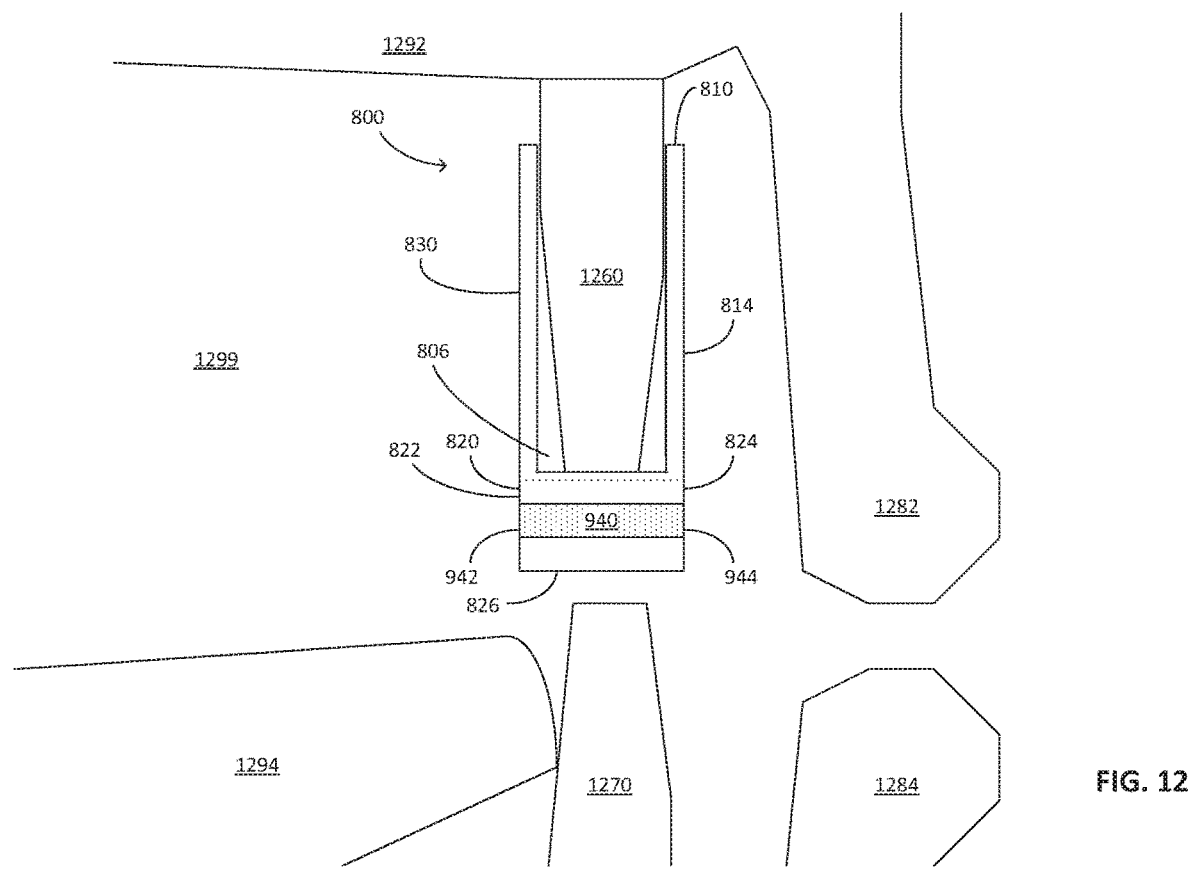
FIG. 12 is a schematic side cross-section view of a whistle mouthpiece taken along line A-A' in FIG. 8, in accordance with one or more further other embodiments of the disclosure, wherein the whistle mouthpiece is disposed within a mouth of a human being.

FIG. 12 is a schematic side cross-section view of a whistle mouthpiece 800 taken along line A-A' in FIG. 8, in accordance with one or more further other embodiments of the disclosure, wherein the whistle mouthpiece 800 is fully contained within a mouth 1299 of a human being. Specifically, the cavity 806 is substantially filled by the upper teeth 1260 of the human being. The whistle mouthpiece 800 may be positioned with minimal disturbance to the lower teeth 1270, the tongue 1294, the palate 1292, the lips 1282 and 1284, and/or other structures disposed in and around the mouth 1299. For the avoidance of doubt, FIG. 12 and the various structures depicted therein are not to scale.

Although FIGS. 8-12 depict a whistle mouthpiece 800 or 1100 configured to fit upper teeth of a human being, the person of ordinary skill in the art would find it routine to adapt the depictions and descriptions to form a whistle mouthpiece configured to fit lower teeth of a human being, or a whistle mouthpiece comprising two sub-apparatus, one configured to fit upper teeth and another configured to fit lower teeth.

What is claimed:

1. An apparatus, wherein:
   the apparatus is curved in top view, has a U-shape in side cross-section, and comprises a first side portion, a bottom portion, and a second side portion, wherein the first side portion and the second side portion are configured to fit upper teeth of a human being with the first side portion being on an outer curve of the curve in top view and the second side portion being on an inner curve of the curve in top view;
   wherein the first side portion has an outer face and the outer face comprises at least one decorative member;
   wherein the bottom portion comprises at least one slot that is capable of producing a whistling sound when air passes through said slot, wherein said slot has an inlet opening at a back of the bottom portion adjacent the second side portion and an outlet opening at a front of the bottom portion adjacent the first side portion or at a bottom side of the bottom portion;
   wherein said outer face is substantially vertical from a top of said first side portion to a top of said bottom portion;
   wherein said bottom side of said bottom portion is substantially perpendicular to said outer face; and
   wherein said apparatus is configured to be fully contained within a mouth of said human being when the U-shape is fitted over said upper teeth of said human being.

2. The apparatus of claim 1, wherein the bottom portion comprises two, four, or six of the slots.

3. The apparatus of claim 1, wherein the at least one decorative member is a plurality of jewels.

4. The apparatus of claim 1, wherein the at least one decorative member is affixed or formed into the outer face.

5. The apparatus of claim 1, further comprising a padding material disposed on an inner face of the first side portion, an inner face of the second side portion, or both.

6. The apparatus of claim 1, wherein the apparatus comprises silver, gold, another metal, plastic, rubber, a composite material, or two or more thereof.

7. The apparatus of claim 1, wherein the first and second side portions are disposed in a first piece and the bottom portion is disposed in a second piece, wherein the first piece and the second piece are capable of being attached and detached to each other.

8. The apparatus of claim 7, wherein the first piece and the second piece comprise at least one of snap-in fasteners, slide-in fasteners, or tongue-and-groove fasteners.

9. The apparatus of claim 1, wherein the bottom portion comprises a plurality of openings, wherein each opening produces a different frequency or tone when air passes therethrough.

10. An apparatus, wherein:
    wherein the first side portion has an outer face and the outer face comprises at least one decorative member;
    wherein the top portion comprises at least one slot that is capable of producing a whistling sound when air passes through said slot, wherein said slot has an inlet opening at a back of the top portion adjacent the second side portion and an outlet opening at a front of the top portion adjacent the first side portion or at a top side of the top portion;
    wherein said outer face is substantially vertical from a bottom of said first side portion to a top of said top portion;
    wherein said top side of said top portion is substantially perpendicular to said outer face; and
    wherein said apparatus is configured to be fully contained within a mouth of said human being when the ∩-shape is fitted over said lower teeth of said human being.

11. The apparatus of claim 10, wherein the top portion comprises two, four, or six of the slots.

12. The apparatus of claim 10, wherein the at least one decorative member is a plurality of jewels.

13. The apparatus of claim 10, wherein the at least one decorative member is affixed or formed into the outer face.

14. The apparatus of claim 10, further comprising a padding material disposed on an inner face of the first side portion, an inner face of the second side portion, or both.

15. The apparatus of claim 10, wherein the apparatus comprises silver, gold, another metal, plastic, rubber, a composite material, or two or more thereof.

16. The apparatus of claim 10, wherein the first and second side portions are disposed in a first piece and the top portion is disposed in a second piece, wherein the first piece and the second piece are capable of being attached and detached to each other.

17. The apparatus of claim 16, wherein the first piece and the second piece comprise at least one of snap-in fasteners, slide-in fasteners, or tongue-and-groove fasteners.

18. The apparatus of claim 10, wherein the top portion comprises a plurality of openings, wherein each opening produces a different frequency or tone when air passes therethrough.

19. An apparatus, comprising:
    a first sub-apparatus that is curved in top view, has a U-shape in side cross-section, and comprises a first side portion, a bottom portion, and a second side portion, wherein the first side portion and the second side portion of the first sub-apparatus are configured to fit upper teeth of a human being with the first side portion being on an outer curve of the curve in top view and the second side portion being on the inner curve of the curve in top view;
    a second sub-apparatus that is curved in top view, has a ∩-shape in side cross-section, and comprises a third side portion, a top portion, and a fourth side portion, wherein the third side portion and the fourth side portion of the second sub-apparatus are configured to fit lower teeth of a human being with the third side portion being on an outer curve of the curve in top view and the fourth side portion being on an inner curve of the curve in top view;
    wherein the first side portion of the first sub-apparatus has a first outer face and the third side portion of the second sub-apparatus has a second outer face, and the first outer face and the second outer face each comprise at least one decorative member;
    wherein the bottom portion of the first sub-apparatus comprises at least one first slot that is capable of producing a whistling sound when air passes through said first slot, wherein said first slot has a first inlet opening at a back of the bottom portion of the first sub-apparatus adjacent the second side portion of the first sub-apparatus and a first outlet opening at a front of the bottom portion of the first sub-apparatus adjacent the first side portion of the first sub-apparatus or at a bottom side of the bottom portion of the first sub-apparatus;
    wherein the top portion of the second sub-apparatus comprises at least one second slot that is capable of producing a whistling sound when air passes through said second slot, wherein said second slot has a second inlet opening at a back of the top portion of the second sub-apparatus adjacent the fourth side portion of the second sub-apparatus and a second outlet opening at a front of the top portion of the second sub-apparatus adjacent the third side portion of the second sub-apparatus or at a top side of the top portion of the second sub-apparatus;
    wherein said first outer face of said first side portion of said first sub-apparatus is substantially vertical from a top of said first side portion of said first sub-apparatus to a top of said bottom portion of said first sub-apparatus;
    wherein said outer face of said third side portion of said second sub-apparatus is substantially vertical from a bottom of said third side portion of said second sub-apparatus to a top of said top portion of said second sub-apparatus;
    wherein said bottom side of said bottom portion of said first sub-apparatus is substantially perpendicular to said first outer face of said first side portion of said first sub-apparatus;
    wherein said top side of said top portion of said first sub-apparatus is substantially perpendicular to said second outer face of said third side portion of said second sub-apparatus; and
    wherein said apparatus is configured to be fully contained within a mouth of said human being when both the U-shape is fitted over said upper teeth of said human being and the ∩-shape is fitted over said lower teeth of said human being.

20. The apparatus of claim 19, wherein the bottom portion of said first sub-apparatus comprises two, four, or six of said first slots; the top portion of said second sub-apparatus comprises two, four, or six of said second slots; or both.

\* \* \* \* \*